United States Patent [19]
Weinrotter et al.

[11] 3,875,222

[45] Apr. 1, 1975

[54] PROCESS FOR THE PRODUCTION OF MALIC ACID

[75] Inventors: Ferdinand Weinrotter; Alfred Schmidt, both of Linz/Danube, Austria; Wolfgang Gauster, Lisse, Netherlands

[73] Assignee: Osterreichische Stickstoffwerke Aktiengesellschaft, Linz/Donau, Austria

[22] Filed: June 29, 1973

[21] Appl. No.: 374,887

[30] Foreign Application Priority Data
July 25, 1972 Austria ............................... 6367/72
July 31, 1972 Germany ........................... 2237685

[52] U.S. Cl. ............................................ 260/535 P
[51] Int. Cl. ............................................ C07c 59/12
[58] Field of Search ................................ 260/535 P

[56] References Cited
UNITED STATES PATENTS
3,391,187  7/1968  Cullen, Jr. et al. ............... 260/535 P FOREIGN PATENTS OR APPLICATIONS
874,580  8/1961  United Kingdom ................ 260/535

OTHER PUBLICATIONS

Vogel, Practical Organic Chemistry, (3rd Ed.), 1958, pp. 122–125.

*Primary Examiner*—Lorraine A. Weinberger
*Assistant Examiner*—Paul J. Killos
*Attorney, Agent, or Firm*—Wenderoth, Lind & Ponack

[57] ABSTRACT

Pure malic acid is prepared by treating a crude malic acid solution in a liquid-liquid extraction with an organic solvent which is immiscible with the malic acid solution and possesses good solvent power for maleic acid and fumaric acid, but in which the malic acid is so much less soluble that the distribution coefficient $Dc = C_{water}/C_{solvent}$ of malic acid bears a ratio of at least 4:1 to that of maleic acid, and subsequently isolating the malic acid from the purified solution.

9 Claims, No Drawings

PROCESS FOR THE PRODUCTION OF MALIC ACID

This invention relates to a process for the preparation of malic acid.

Malic acid is gaining increasing importance in the manufacture of jelly, as an acidifying agent in bottled drinks, and as an emulsifier in the manufacture of margarine and mayonnaises. Here, it competes with citric acid, but even surpasses the latter in its non-toxicity.

It is known 50carry out large-scale industrial manufacture of malic acid, apart from fermentative processes, by the addition of water to the double bond of maleic acid or fumaric acid at an elevated temperature of 160° to 200°C under pressure, in 35 to 50% strength aqueous solution. In such a process an equilibrium becomes established after about four hours, about 60% of the maleic acid or fumaric acid employed having been converted into malic acid. In addition, mainly furmaric acid and small amounts of maleic acid are present in the equilibrium reaction mixture. On cooling this solution, the fumaric acid largely crystallises out and can be filtered off. The solution which remains then contains 1 to 2 parts of maleic acid and 1 to 1.5 parts of fumaric acid per 100 parts by weight of dissolved malic acid. If this solution is now evaporated in order to crystallise out the malic acid, considerable amounts of maleic acid and fumaric acid also crystallise out and contaminate the malic acid. Maleic acid, above all, is an undesired contaminant of malic acid, because of the toxicity of the former. The Food Chemicals Codex of the U.S.A. prescribes the following with regard to the impurities:

Maleic acid less than 0.05%
Fumaric acid less than 0.5%
Heavy metals, less than 20 ppm as lead.

Several processes are known for isolating malic acid which meets these standards from the crude malic acid solution prepared by the industrial process described.

According to French Pat. Spec. No. 1,466,681, a crude malic acid solution of at least 40% strength by weight is freed from crystallised-out fumaric acid, at about 15°C. It is then concentrated in vacuo to a malic acid content of at least 62% by weight and the malic acid which crystallises out at 40°C. is separated off and again dissolved in an equal amount of water. This solution is filtered and concentrated at 40°C. to a malic acid content of at least 62% by weight. The crystalline malic acid which precipitates therefrom is separated off and washed with saturated malic acid solution which is free of maleic acid and fumaric acid.

A disadvantage of the above process is that substantial amounts of various mother liquors and malic acid solutions must be handled and must be recycled to the process to avoid losses at various points.

According to Netherlands Published Pat. No. 66/17,262, crude malic acid solution is passed over a weakly basic anion exchanger. According to French Pat. No. 1,464,229, crude malic acid solution is successively passed over:

a. coarse-pored active charcoal (20 to 100 Angstrom) to remove coloured impurities,
b. a weakly basic anion exchanger,
c. fine-pored active charcoal (18 to 21 Angstrom), which is capable of retaining fumaric acid which may have passed through, and
d. a cation exchanger.

Pure malic acid can be obtained by both processes but rather dilute solutions must be used (less than 40% strength by weight) and the losses of malic acid are also relatively high (15 to 45%). Furthermore, the rinsing of the exchanger columns with water causes a considerable dilution of the pure malic acid solutions.

According to Netherlands Published Pat. No. 67/10,132, the unsaturated impurities in the crude malic acid solution (maleic acid and fumaric acid) are hydrogenated with molecular hydrogen under pressure in the presence of a metal hydrogenation catalyst (particularly palladium on active charcoal). This produces succinic acid which is crystallised out together with the malic acid. This malic acid is contaminated with 0.5 to 5, particularly 0.5 to 3, percent by weight of succinic acid.

According to German Offenlegungsschrift No. 1,768,926, the maleic acid and fumaric acid are treated with ozonised air and the glyoxylic acid and oxalic acid thereby formed are oxidised with hydrogen peroxide to carbon dioxide and water, using a noble metal catalyst. A disadvantage of this process is the use of expensive chemicals such as ozone and hydrogen peroxide, the difficulty of recovery of the expensive noble metal catalyst and the lower yield of malic acid from the overall process, due to the destruction of the maleic acid and of the fumaric acid still present.

It has now been found that there are some organic solvents in which the distribution coefficient between water and the solvent, for malic acid on the one hand and maleic acid and fumaric acid on the other, is so different that it is possible to remove the two acids from the contaminated aqueous malic acid solution by liquid-liquid extractions. This discovery is suprising since the difference in chemical structure of the acids is relatively slight.

Accordingly, the present invention provides a process for the preparation of pure malic acid, suitable for consumption in food and drink, from an aqueous solution obtained by the addition of water to maleic acid and/or fumaric acid under pressure and at an elevated temperature, which comprises treating the crude malic acid solution obtained after removing the fumaric acid which has crystallised out, in a liquid-liquid extraction, with an organic solvent which is immiscible with the malic acid solution and possesses good solvent power for maleic acid and fumaric acid, but in which the malic acid is so much less soluble that the distribution coefficient $Dc = C_{water}/C_{solvent}$ of malic acid bears a ratio of at least 4:1 to that of maleic acid, and subsequently isolating the malic acid from the purified solution.

In principle, any organic solvent which is not completely miscible with the aqueous malic acid at the extraction temperature and which possesses the requisite different solvent power for malic acid and maleic acid or fumaric acid, is suitable. Appropriately, however, solvents are employed for which there is no danger that they might react with one of the acids present. Ketones containing 5 to 10 carbon atoms and ethers containing 4 or 5 carbon atoms have proved particularly suitable. Esters of acetic acid with aliphatic monoalcohols containing up to 6 carbon atoms also possess the requisite solvent power for use as solvents for the liquid-liquid extraction. However, preferably, the extraction should be carried out at room temperature, since otherwise there is a possibility of trans-esterification to give malic acid esters. This inherently slight transesterification, however, is objectionable only if a continuous recycling of the evaporation residue of the organic solvent to the water addition reaction is intended. Chlorinated hydrocarbons are less suitable for use as solvents since they cause discolourations.

Examples of advantageous solvents are diethyl ketone, methyl isopropyl ketone, methyl isobutyl ketone, ethyl isoamyl ketone, methyl isoamyl ketone, diisobutyl ketone, cyclohexanone, diethyl ether, ethyl acetate, isoamyl acetate and n-butyl acetate. Particularly advantageous solvents are those which not only fulfil the requirement that the minimum ratio of the distribution coefficients $Dc = C_{water}/C_{solvent}$ is 4:1 but for which the distribution coefficient $Dc = C_{water}/C_{solvent}$ for maleic acid is less than 11. In such cases, the requirements with regard to the separating action of the extraction column or the number of plates thereof are not excessive.

Such particularly preferred solvents are, for example, methyl isobutyl ketone, for which the distribution coefficient for malic acid $C_{water}/C_{ketone}$ is 23.9, that for maleic acid is 4.0 and that for fumaric acid is 0.69. From this, the ratio of the distribution coefficients of malic acid and maleic acid is 6:1. In the case of diethyl ketone, the distribution coefficient for malic acid is 13.9, that for maleic acid is 2.8 and that for fumaric acid is 0.65, from which the ratio of the distribution coefficients for malic acid and maleic acid is 5. In both cases, extraction columns with 10 to 15 theoretical plates prove satisfactory. On the other hand, in the case of diethyl ether and the acetic acid esters extraction columns with substantially more, for example, more than 40, plates are required.

The ratio of the amount of solvent employed to the amount of crude malic acid solution to be purified depends on the degree of effectiveness of the extraction column, that is to say on the number of its theoretical plates and on the desired purity of the malic acid solution. The more solvent is used, the fewer theoretical plates are required in the extraction column in order to achieve a certain desired purity in the extracted solution. It has proved desirable to employ at least as much solvent as malic acid solution for the extraction.

The extraction apparatus usually employed in industry may be used for the extraction. The extraction temperature is not of decisive importance as regards the desired success. The optimum extraction temperature depends in each case on the extractant employed. However, in most cases the success of the extraction at room temperature is so good that the additional advantages which may be achievable through a higher or a lower extraction temperature bear no relation to the additional effort required.

The isolation of the malic acid from the solution purified by extraction is then carried out in the usual manner by evaporating the solution, for example to a concentration of about 90%, crystallising the malic acid and separating off and drying the solid malic acid. The mother liquor from the malic acid crystallisation is returned to the reactor. The solvent used for the extraction is purified either by extraction with pure water or by distillation and is re-used, as is the maleic or fumaric acid obtained at the same time.

Since only organic compounds are removed from the crude malic acid solution by the extraction with the organic solvent, but inorganic compounds such as, for example, heavy metals, which may enter the solution as corrosion products, are not removed, it has proved appropriate to manufacture the malic acid in a pressure vessel which is completely resistant both to maleic acid and fumaric acid and to malic acid under these conditions. Every type of corrosion is prevented in an autoclave which is lined with a temperature-resistant plastics material. Polymerised fluorohydrocarbons, for example, polytetrafluoroethylene, are particularly suitable for use as a lining.

Since the purification of the malic acid by extraction takes place continuously it is appropriate also to allow the synthesis to take place continuously. However, it is of course also possible to work discontinuously up to the extraction stage.

It is not necessary to extract the maleic acid and the fumaric acid from the malic acid solution to the point that the extracted solution only retains 0.05% of maleic acid and 0.5% of fumaric acid, relative to the malic acid present. This is because malic acid may be crystallised out, in this requisite purity, even from solutions which are more heavily contaminated with maleic acid or fumaric acid, provided not all the malic acid but only part thereof is crystallised out from the solution. In practice, this is achieved by evaporating the aqueous solution, obtained after the extraction, only to a malic acid concentration of about 75 to 85%. The mother liquid then obtained, which contains maleic acid and/or fumaric acid in addition to the residual malic acid, for example, may be recycled to the addition reaction of water to maleic acid or fumaric acid, so that a good yield of malic acid is nevertheless achieved.

The following Examples of embodiments, in which all percentages are by weight, are intended to illustrate the invention in more detail.

EXAMPLE 1

320 G. of water, 120 g. of maleic anhydride and 80 g. of fumaric acid were heated for four hours to 200°C. in an autoclave lined with polytetrafluoroethylene. After cooling the solution, 84 g. of fumaric acid which had crystallised out was filtered off and used for a subsequent batch. The 436 g. of malic acid solution which was left contained 35.2% of malic acid, 0.57% of maleic acid and 0.50% of fumaric acid. The solution was extracted with 870 g. of methyl isobutyl ketone in a glass extraction column in countercurrent, at room temperature. The purified malic acid solution contained 32.0% of malic acid, 0.09% of maleic acid and 0.01% of fumaric acid. This solution was evaporated in vacuo at 50°C. down to a water content of 10%. After filtration and drying, 118 g. of malic acid containing 0.02% of maleic acid and 0.02% of fumaric acid were obtained.

EXAMPLE 2

390 G. of water and 260 g. of maleic anhydride were allowed to react for 10 hours at 180°C. in the autoclave as described in Example 1. After cooling, the solution was filtered, 108 g. of fumaric acid being separated off. The filtrate (530 g.) contained 2.7 g. of maleic acid, 2.3 g. of fumaric acid and 225 g. of malic acid. It was extracted with 700 g. of diethyl ketone in a countercurrent extraction column. After separating off the diethyl ketone, the malic acid solution was evaporated in vacuo down to a water content of 10%. 180 G. of malic acid containing 0.02% of maleic acid and 0.03% of fumaric acid was obtained.

EXAMPLE 3

350 G. of water was allowed to react with 260 g. of fumaric acid for four hours at 200°C. in the autoclave as described in Example 1. After cooling the solution, 106 g. of fumaric acid was filtered off. 504 G. of filtrate, containing 3.8 g. of maleic acid, 3.0 g. of fumaric acid and 170 g. of malic acid, was left. The solution was extracted with 850 g. of diethyl ether. 145 G. of malic acid containing 0.03% of maleic acid and 0.03% of fumaric acid was obtained from the extracted solution by evaporating the solution down to a water content of 10% and separating off the crystals.

We claim:

1. A process for the preparation of pure malic acid, suitable for consumption in food and drink, from an aqueous solution obtained by the addition of water to maleic acid and/or fumaric acid under pressure and at an elevated temperature, which comprises treating the crude malic acid solution obtained after removing the fumaric acid which has crystallised out, in a liquid-liquid extraction, with an organic solvent which is immiscible with the malic acid solution and possesses good solvent power for maleic acid and fumaric acid, but in which the malic acid is so much less soluble that the distribution coefficient $Dc = C_{water}/C_{solvent}$ of malic acid bears a ratio of at least 4:1 to that of maleic acid, and subsequently isolating the malic acid from the purified solution.

2. A process according to claim 1, in which the organic solvent used for the liquid-liquid extraction is an aliphatic ketone containing 5 to 10 carbon atoms.

3. A process according to claim 1, in which the organic solvent used for the liquid-liquid extraction is an aliphatic ether containing 4, 5 or 6 carbon atoms.

4. A process according to claim 1, in which the organic solvent used for the liquid-liquid extraction is an ester of acetic acid with an aliphatic monoalcohol containing up to 6 carbon atoms.

5. A process according to claim 1, in which the amount of solvent used for the extraction is at least as great as the amount of the malic acid solution employed.

6. A process according to claim 1, in which the extraction is carried out at room temperature.

7. A process according to claim 1, in which the malic acid solution employed is one which has been obtained by addition of water to maleic acid and/or fumaric acid in an autoclave lined with a layer of polymeric fluorohydrocarbons.

8. A process according to claim 7, in which the lining of the autoclave is made from polytetrafluoroethylene.

9. A process according to claim 1, in which the mother liquor of the malic acid crystalliation and/or the maleic acid or fumaric acid constituent from the organic solvent are recycled to the water addition reaction.

* * * * *